United States Patent [19]

Bierman

[11] Patent Number: 4,734,725

[45] Date of Patent: Mar. 29, 1988

[54] APPARATUS FOR PHOTOGRAPHING OBJECTS AND/OR PERSONS SIMULTANEOUSLY WITH THE OCCURRENCE OF A PREDETERMINED EVENT

[76] Inventor: John C. A. Bierman, 4304 Garfield St., Anchorage, Ak. 99503

[21] Appl. No.: 940,748

[22] Filed: Dec. 11, 1986

[51] Int. Cl.[4] .................. G03B 15/00; G03B 17/38; G08G 1/00; E01F 9/00

[52] U.S. Cl. .................. 354/76; 354/266; 346/107 R; 340/937; 340/22; 40/612; 116/63 R

[58] Field of Search .................. 354/410, 75, 76, 81, 354/266, 131; 346/107 A, 107 B, 107 VP, 107 R; 40/612; 116/63 R; 340/22, 937

[56] References Cited

U.S. PATENT DOCUMENTS

| | | | |
|---|---|---|---|
| 1,701,800 | 2/1929 | Taylor . | |
| 2,871,088 | 1/1959 | Abell | 354/75 |
| 3,243,806 | 3/1966 | Handschin | 343/8 |
| 3,244,086 | 4/1966 | Craghead | 354/76 |
| 3,961,342 | 6/1976 | Maida | 354/131 X |
| 4,593,985 | 6/1986 | Minakuchi | 354/266 X |

FOREIGN PATENT DOCUMENTS

| | | | |
|---|---|---|---|
| 2444355 | 4/1976 | Fed. Rep. of Germany | 354/266 |

*Primary Examiner*—W. B. Perkey

*Attorney, Agent, or Firm*—Donald A. Kettlestrings

[57] ABSTRACT

Apparatus for photographing objects and/or persons simultaneously with the occurrence of a predetermined event wherein the apparatus is particularly adapted for photographing persons when they shoot traffic signs along highways. The impact of a bullet against the traffic sign energizes an encoded transmitter with transmits a radiofrequency into the air for a first predetermined time period. A receiver/decoder is located remotely from the transmitter for receiving the radiofrequency signal from the transmitter, and a camera is positioned to photograph persons and/or vehicles within a predetermined area adjacent to the traffic sign during the period of time that a signal is received by the receiver/decoder.

7 Claims, 7 Drawing Figures

APPARATUS FOR PHOTOGRAPHING OBJECTS AND/OR PERSONS SIMULTANEOUSLY WITH THE OCCURRENCE OF A PREDETERMINED EVENT

This invention relates to apparatus for photographing objects and/or persons simultaneously with the occurrence of a predetermined event and more particularly to such apparatus specifically adapted for photographing persons when they shoot traffic signs along highways.

Traffic signs are frequently damaged by vandals who use the signs for target practice. Damage to traffic signs from such vandalism results in large maintenance and replacement costs for federal, state and local governments.

It is, therefore, an object of the present invention to provide an apparatus for photographing persons who shoot traffic signs along highways.

Another object is to provide for such an apparatus wherein each traffic sign is provided with a pulse-encoded transmitter-receiver system so that two or more of such systems can be used in close proximity to each other.

A further object of the invention is to provide such an apparatus wherein the camera is located in a position remote from the traffic sign.

Still another object is to provide such an apparatus wherein the traffic sign is specially designed to detect the impact of a bullet.

Yet another object of the present invention is the provision of such an apparatus wherein a pulse-encoded radiofrequency signal is transmitted to a remotely located receiver/decoder when a bullet strikes the traffic sign.

A still further object of the invention is the provision of such apparatus wherein the camera is energized when the transmitter, located on or adjacent to the traffic sign, is energized.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides means for detecting the occurrence of an event, such as the impact of a bullet against a traffic sign; transmitting means in operative relationship with the detecting means for transmitting an encoded radiofrequency signal into the air for a first predetermined time period in response to activation of the detecting means by occurrence of the event; receiver means remotely positioned from the transmitting means for receiving the radiofrequency signal from the transmitting means and for providing a first resultant encoded electrical output signal; means in operative relationship with the receiver means for decoding the encoded output signal and for providing a second resultant electrical output signal; and a camera positioned to enable photographing of the objects and/or persons within a predetermined area and in operative relationship with the receiver means and with the decoding means for enabling operation of the camera for the first predetermined time period in response to the second resultant electrical output signal.

In accordance with the invention, the detecting means included a first electrically conducting substantially flat sign member; a second electrically conducting substantially flat sign member which carries the message of the traffic sign; a plurality of electrically insulating connectors between the sign members and connecting together the sign members; an electrically insulating spacer element mounted on each of the connectors and positioned between the first and second sign members for normally maintaining the sign members in predetermined spaced apart relationship with respect to each other; a first electrically conducting element in contact with the first sign member and in electrical circuit relationship with the transmitting means; and a second electrically conducting element in contact with the second sign member and in electrical circuit relationship with the transmitting means.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

Figure 1:
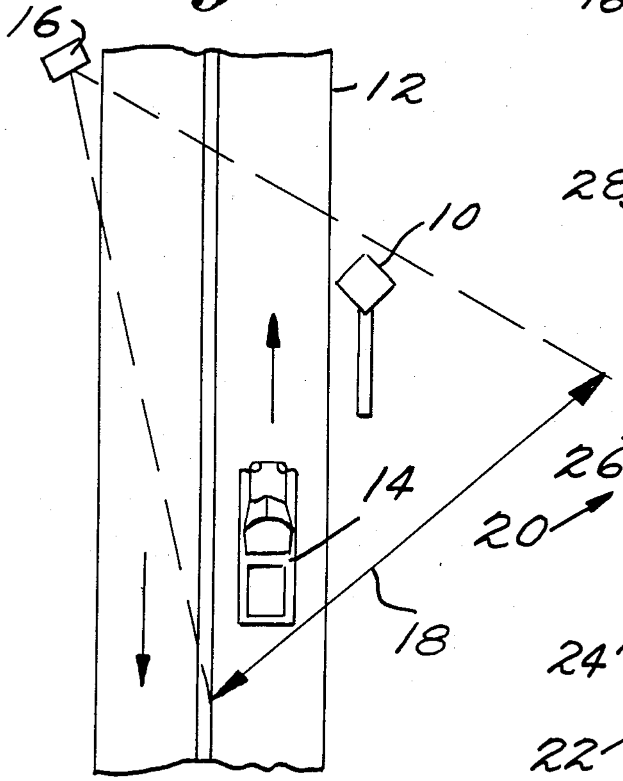
FIG. 1 is a diagrammatic view of the apparatus of this invention illustrating the locations of the traffic sign and the camera with respect to the roadway.

With reference now to the drawings, wherein like reference characters designate like or corresponding parts throughout the several views, there is shown in FIG. 1 a traffic sign 10 conventionally located adjacent highway 12, and a vehicle 14 is shown travelling on the highway and adjacent to the traffic sign 10. Camera 16 is positioned at a location remote from traffic sign 10 and camera 16 is aimed to enable the photographing of persons and/or vehicles within predetermined area 18.

Figure 2:
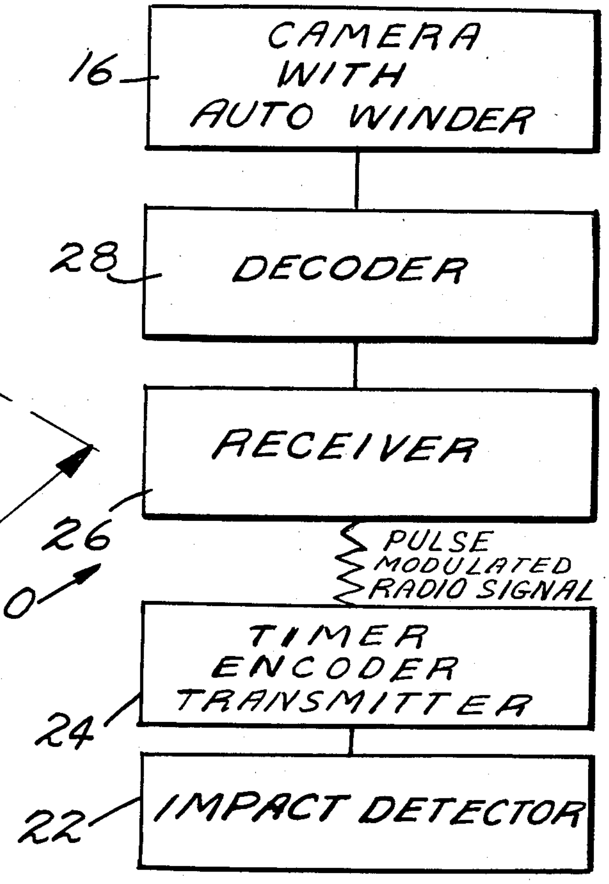
FIG. 2 is a block diagram view of the apparatus of this invention.

FIG. 2 shows, in block diagram, apparatus 20 in accordance with this invention. Apparatus 20 includes means 22 in operative relationship with traffic sign 10 for detecting the impact of a bullet against sign 10. Timer-encoder-transmitting means 24 are provided in operative relationship with detecting means 22 for transmitting an encoded radiofrequency signal into the air for a first predetermined time period in response to activation of detecting means 22 by impact of a bullet against sign 10.

Receiver means 26 is remotely positioned from transmitting means 24 and from sign 10 for receiving the radiofrequency signal from transmitting means 24 and for providing a first resultant encoded electrical output signal. Means 28 are provided in operative relationship with receiver means 26 for decoding the encoded output signal from receiver means 26 and for providing a second resultant electrical output signal.

Camera 16 is positioned, as illustrated in FIG. 1, to enable photgraphing of persons and vehicles within predetermined area 18. Camera 16 is in operative relationship with receiver means 26 and with decoder means 28 for enabling operation of camera 16 for a predetermined time period in response to the second resultant electrical output signal from decoder means 28. Camera 16 is activated as long as transmitting means 24 is transmitting a radiofrequency signal and receiver means 26 is receiving the radiofrequency signal.

Figure 5:
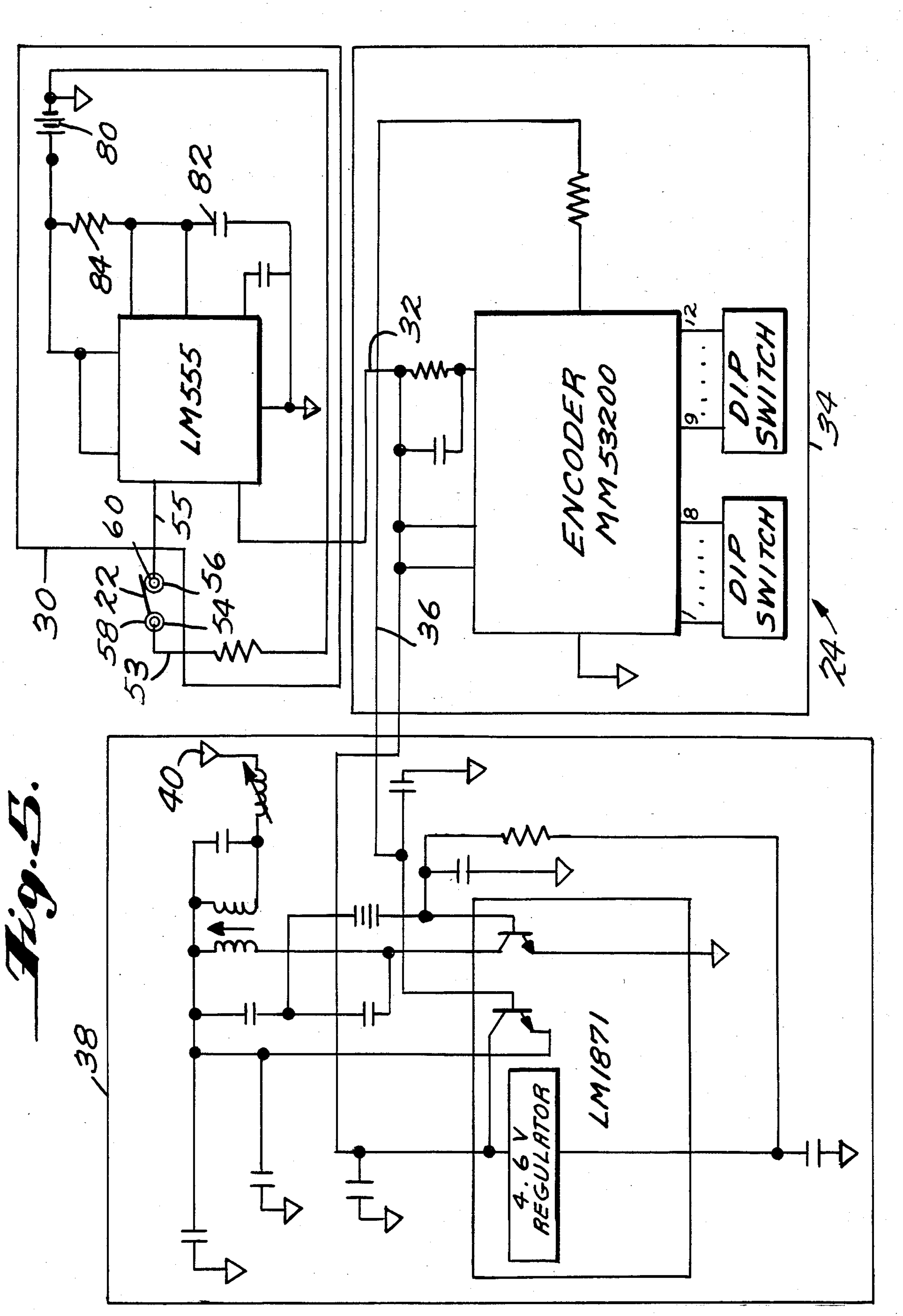
FIG. 5 is a diagrammatic illustration of one preferred embodiment of the timer-encoder-transmitter of this invention.

One example of a preferred embodiment of transmitting means 24 is shown in FIG. 5. It should be understood that the specific circuit elements illustrated in FIG. 5 are exemplary only and that other circuit elements and configurations may be used.

As illustrated in FIG. 5, transmitting means 24 include timer means 30 in operative relationship with detecting means 22 for providing a third electrical output signal at output 32 during the predetermined time period that transmitting means 24 is transmitting. Timer means 30 provides the third electrical output signal at output 32 in response to activation of detecting means 22 by impact of a bullet against sign 10. This is described in more detail below.

Still referring to FIG. 5, encoding means 34 is in operative relationship with timer means 30 for receiving the third output signal at 32 and for providing a fourth resultant encoded electrical output signal at lead 36. Oscillator-transmitter means 38 are provided in operative relationship with encoding means 34 for receiving the fourth encoded output signal at lead 36 and for transmitting a resultant pulse-encoded radiofrequency signal into the air via antenna 40.

In the specific embodiment example shown in FIG. 5, timer means 30 is LM555 Timer described in the CMOS/Linear Data Book with supplement B as sold by Jim-Pak Electronic Components of Belmont, Calif. FIG. 1 on page 94 of the CMOS/Linear Data Book shows timer means 30 as used in the specific embodiment example illustrated in FIG. 5 herein.

Figure 7:
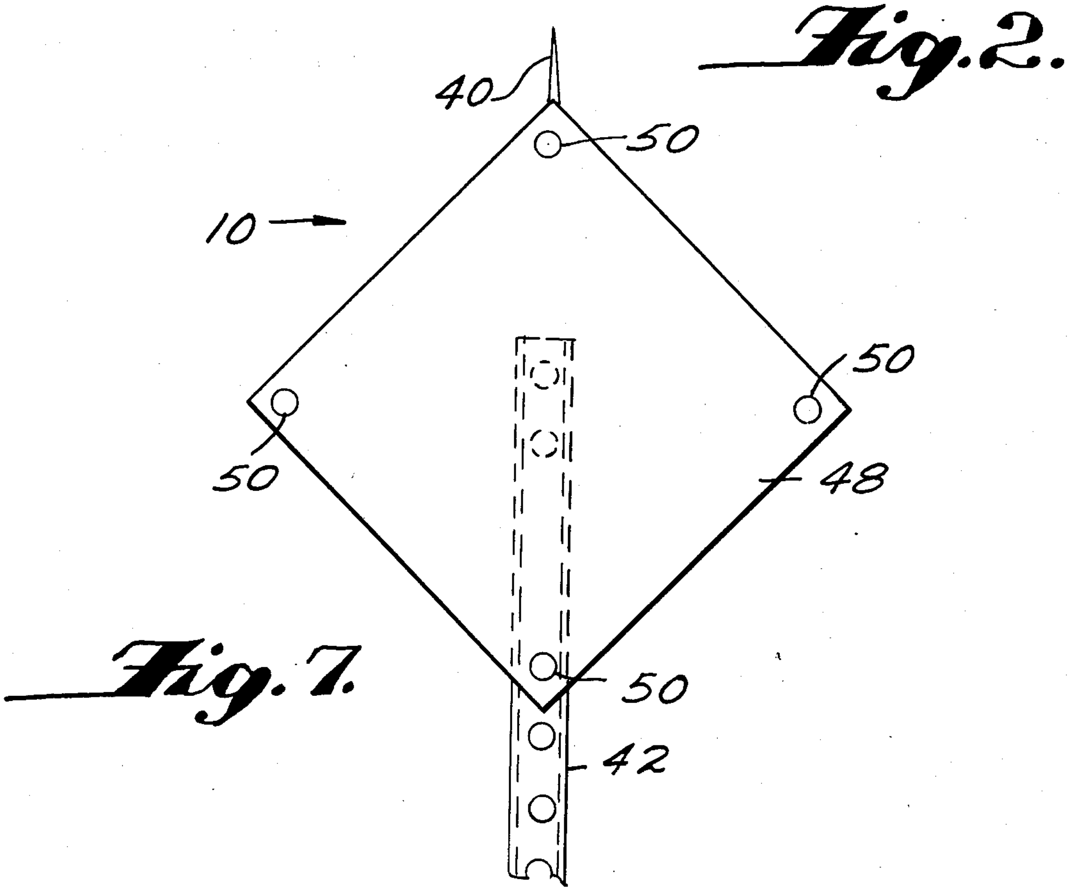
FIG. 7 is a fragmentary front elevation view of the traffic sign.

Encoding means 34 in FIG. 5 are described and illustrated in publications of National Semiconductor Corp. The specific configuration shown in the example of FIG. 5 herein is illustrated in FIG. 7 of a publication by National Semiconductor Corp. entitled "Electronic Data Processing" and describing the MM53200 Encoder/Decoder. Further discussion of the MM53200 Encoder/Decoder is provided in the National Semiconductor Corp. publication entitled "Application of the MM53200 Encoder/Decoder", application note AN-290 by Thomas B. Mills and dated January 1982.

The specific configuration of transmitter 38, as illustrated in the example of FIG. 5 herein, is described and illustrated in the National Semiconductor Corp. Linear Data Book, 1982 edition, on Page 9-105. Pages 9-101 to 9-115 describe use of the LM1871 transmitter chip as used in the apparatus of this invention and as illustrated in the example of FIG. 5 herein.

Figure 3:
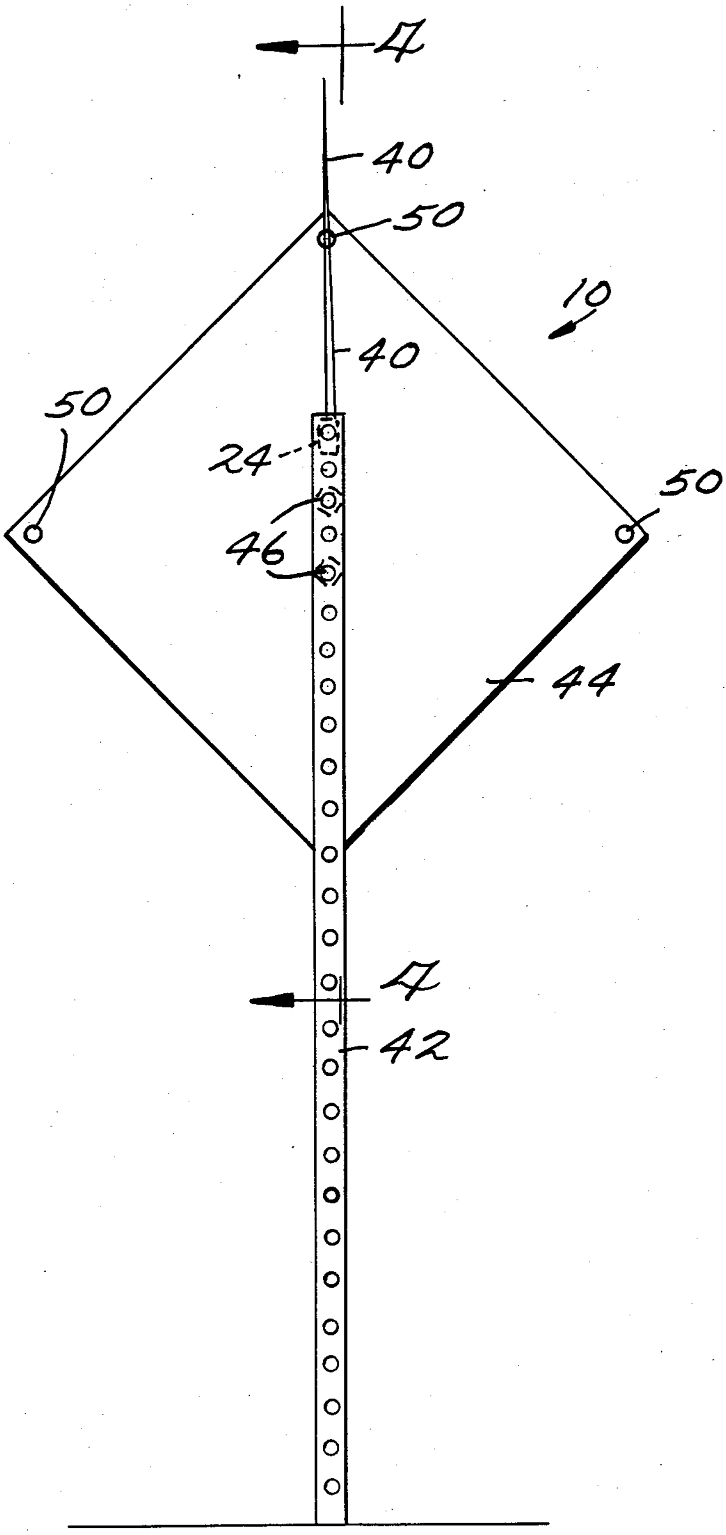
FIG. 3 is a rear elevation view of a traffic sign in accordance with this invention.
Figure 4:
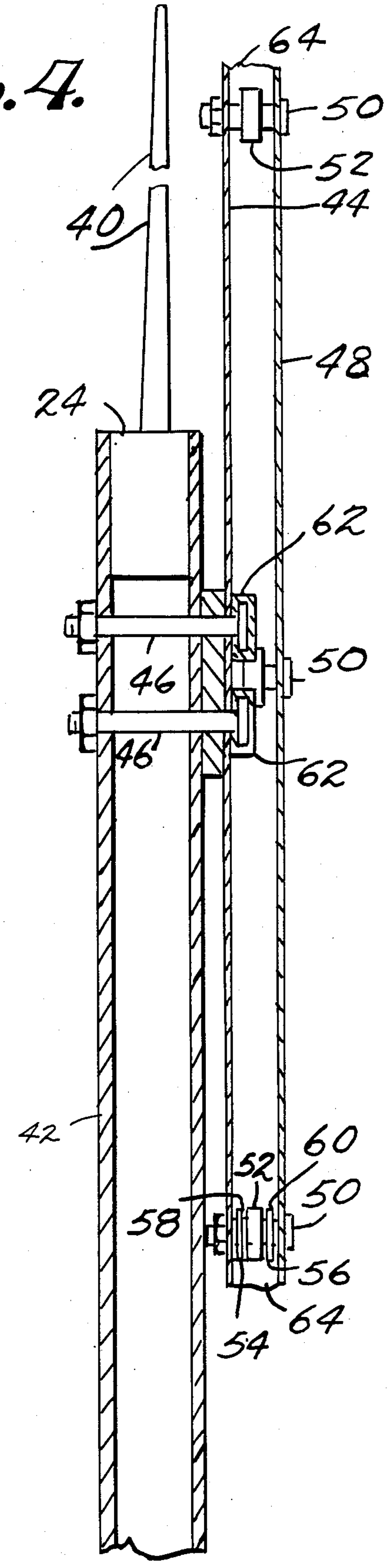
FIG. 4 is a fragmentary side sectional view of a portion of the traffic sign shown in FIG. 3.

Detecting means 22, illustrated diagrammatically in FIG. 5, are shown in more detail in FIGS. 3–5 herein. FIG. 3 shows sign 10 supported in a conventional manner by a Telspar post 42 made of steel. FIG. 3 is a view from the rear of sign 10, and shows a first metal or otherwise electrically conducting substantially flat rear sign member 44 attached to post 42 by steel mounting bolts and nuts 46. A second metal or otherwise electrically conducting substantially flat front sign member 48, shown in FIG. 4, carries the message of the traffic sign.

A plurality of electrically insulating connectors 50 are provided between sign members 44 and 48, and connectors 50 act to hold sign members 44 and 48 together. An electrically insulating spacer element 52 is mounted on each of connectors 50 and is positioned between sign members 44 and 48 for normally maintaining the sign members in predetermined spaced apart relationship with respect to each other. A first electrically conducting element 54 (see FIGS. 4 and 5) is positioned in contact with first sign member 44 and in electrical circuit relationship with transmitting means 24. Similarly, a second electrically conducting element 56 is positioned in contact with second sign member 48 and in electrical circuit relationship with transmitting means 24.

Conducting elements 54 and 56 include first and second washers 58, 60, respectively, mounted on one of connectors 50 (see FIG. 4), and first washer 58 is located between sign member 44 and spacer element 52 with second washer 60 located between sign member 48 and spacer element 52.

As illustrated in FIG. 4, the heads of mounting bolts 46 are covered by an electrically insulating material 62, and an electrically insulating fiber tape 64 extends between front and rear sign members 44, 48 and around the entire perimeters of sign members 44 and 48.

Figure 6:
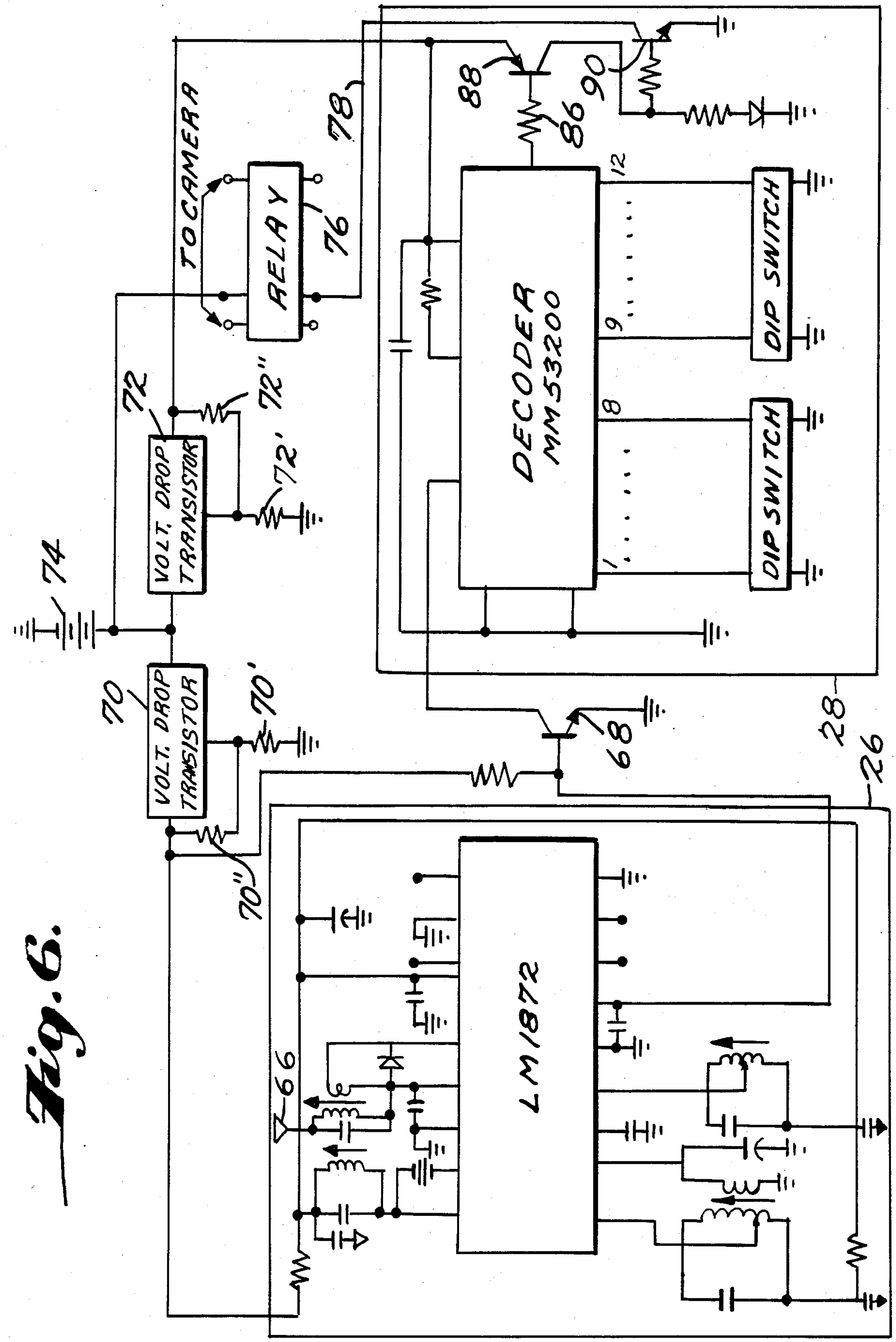
FIG. 6 is a diagrammatic view of one preferred embodiment of the receiver-decoder of this invention.

One example of an embodiment of receiver means 26 and decoder means 28 is illustrated in FIG. 6. It should be understood that the specific circuit elements illustrated in FIG. 6 are exemplary only and that other specific circuit elements and configurations may be used.

Receiving antenna 66 is located at a remote position from transmitting antenna 40, and receiving antenna 66 is electrically coupled to receiver means 26. The specific example illustrated in FIG. 6 for receiving means 26 is National Semiconductor Corp. LM1872 radio control receiver/decoder. The circuitry used and illustrated in FIG. 6 herein is illustrated and described in the National Semiconductor Corp. Linear Data Book describing the LM1872 radio control receiver/decoder at page 9-122. The specific example for decoder means 28 is described and illustrated in National Semiconductor Corp. publication "Application Note AN-290" dated January 1982 wherein the MM53200 encoder/decoder is described and illustrated. FIG. 6 herein also illustrates transistor buffer 68 between receiving means 26 and decoder means 28, and voltage drop transistors 70, 72 with associated resistors 70', 70" and 72', 72" provide appropriate voltage drops from voltage source 74 to receiver means 26 and to decoder means 28. A relay 76 is in circuit relationship with output 78 of decoder means 28, and camera 16 with its own DC power supply (not shown) is connected in conventional circuit relationship (not shown) with relay 76 whereby activation of the relay activates camera 16.

In operation, transmitter-timer-encoder means 24 and transmitting antenna 40 are mounted on traffic sign 10, as illustrated in FIG. 3. Transmitting means 24 are contained in a water-proof case (not shown), and antenna 40 is positioned so that metal sign members 44, 48 do not interfere with radiofrequency transmissions from the transmitter.

When front sign member 48 is struck by a bullet or other object, sign member 48 is momentarily deformed and momentarily contacts rear sign member 44. The normal spacing between sign members 44 and 48 and the size and flexibilities of metal sign members 44 and 48 are such that such momentary contact occurs between the sign members when front sign member 48 is struck by a bullet or other object. Spacer elements 52, which may be rubber grommets, are compressed upon impact of the bullet against the sign member 48, and this also allows the sign members to momentarily contact each other at the time a bullet or other object strikes front sign member 48.

The momentary contact between metal sign members 44 and 48 allows a negative voltage to flow from battery 80 (FIG. 5) through wire 53, first washer 58, rear sign member 44 which is in electrical contact with washer 58, through sign member 48, second washer 60 and conductor 55 to the trigger pin of timer 30. The triggering action of timer 30 allows energy to be stored in capacitor 82, and power flows from capacitor 82 to output 32 of timer 30. The length of time necessary to discharge capacitor 82 through resistor 84 determines the timing cycle and the time period during which antenna 40 is transmitting. Although a specific timer 30 is illustrated in FIG. 5 and described herein, it should be understood that other timers can be substituted. The illustration and description of the specific timer 30 and the other specific circuit elements is for the purpose of fully describing one example of a preferred embodiment of the invention.

Discharge of capacitor 82 causes power to flow from timer output 32 to encoder 34 and to transmitter 38. As a result, a pulse-encoded radiofrequency signal is transmitted by antenna 40 for a time period determined by the length of time necessary to discharge capacitor 82 through resistor 84. For example, capacitor 82 is preferably 10 microfarads at 25 volts and resistor 84 is preferably 0.47 megohms which allows transmitter 38 and antenna 40 to operate for approximately six seconds. Of course, the transmission time can be altered by changing the capacity of capacitor 82 and the resistance of resistor 84.

At the end of the timing cycle when transmissions cease from transmitter 40, timer 30 turns off permitting no more power to flow from its output 32, and no further transmissions are emitted from transmitter 40 until timer 30 is again reactivated as a result of a bullet or other object striking front sign member 48 so that it moves into momentary contact with rear sign member 44.

Encoder 34 permits various pulse patterns to be generated, and transmissions from antenna 40 are pulse encoded. Decoder 28 is set to decode the pulse-encoded transmissions from antenna 40. The encoding enables a plurality of transmitter-receivers to be used in close proximity to each other. Transmitter 24 and antenna 40 may be located on traffic sign 10, as shown in FIG. 3, or they may be positioned at a location remote from traffic sign 10.

Camera 16, receiver 26 and decoder 28 are positioned in a remote location from traffic sign 10 and preferably in a concealed position. If necessary, camera 16 may be equipped with a telephoto lens, and the camera is positioned to photograph within predetermined area 18 adjacent to traffic sign 10 (see FIG. 1). A pulse-encoded radiofrequency signal transmitted by antenna 40 is received by receiver 26 by means of receiving antenna 66. The pulse-encoded signal is passed through receiver 26 (FIG. 6), through buffer transistor 68 to decoder 28. Upon receipt of a predetermined pulse-encoded signal, decoder 28 outputs power through resistor 86 to transistor 88 which turns on transistor 90 to allow power to flow through relay 76. Closing of the contacts (not shown) of conventional relay 76 closes a separate conventional circuit (not shown) to camera 16 so power will flow to activate the camera. Camera 16 is a conventional motor-driven camera and uses a separate battery (not shown) for the camera motor. Relay 76 and camera 16 only become activated upon receipt by receiver 26 and decoder 28 of a properly encoded signal from transmitter 24, and the operation time for camera 16 is determined by the length of time that transmitter 24 is transmitting its pulse-encoded signal. Thus, timer 30 associated with transmitter 24 determines the length of time that camera 16 is operative each time that transmitter 24 is activated by the impact of a bullet or other object against front sign member 48. When transmissions from transmitter 24 cease, receiver 26 and encoder 28 no longer receive the proper pulse-encoded signals, and relay 76 and camera 16 are inactivated.

The specific circuit elements illustrated in FIG. 6 for receiver 26 and for decoder 28 are examples of one preferred embodiment. If used alone, the National Semiconductor Corp. receiver LM1872 provides a maximum of six receiver channels. The National Semiconductor Corp. receiver-decoder MM53200 is capable of twelve channel reception but uses coils for frequency tuning which could possibly change in response to temperature changes or vibration. By combining both chips LM1872 and MM53200 the advantage of crystal control of frequency of LM1872 is achieved with the twelve channel capability of MM53200.

In the specific embodiment illustrated in FIG. 6, the voltage requirement of LM1872 is six volts and for MM53200 is nine volts. Power source 74 is twelve volts, and two voltage dropping transistors 70, 72 are used to obtain the necessary voltages. Transistor 70 in combination with resistors 70', 70" yields a six volt output while transistor 72 in combination with resistors 72', 72" yields a nine volt output. Each transistor 70, 72 operates independently of the other.

As previously described, the impact of a bullet causes front sign member 48 to momentarily contact rear sign member 44 to cause transmitter 24 to emit a pulse-encoded radiofrequency signal. Should front sign member 48 become permanently deformed by impact of a bullet and remain in contact with rear sign member 44, battery 80 would supply power until the battery became powerless. By using a nine volt battery, for example, battery 80 will cease to function in less than ten days, as required by Federal Communication Commission rules and regulations, in the event that sign member 48 were to permanently contact sign member 44.

One example of a specific circuit embodiment for transmitter 24 is illustrated in FIG. 5 wherein National Semiconductor Corp. chip LM1871 is used in combination with National Semiconductor Corp. MM53200 encoder/decoder chip. The LM1871 chip is an excellent transmitter with a maximum of six channels. When chip MM53200 is used as a single transmitter, the frequency of operation is determined by the coil and capacitor in the output circuitry to the antenna. The use of a coil and capacitor to determine frequency could result in shifting of the frequency due to possible damage to the coil or due to vibration when traffic sign 10 is struck by a bullet or other object. By modifying the circuitry of chips LM1871 and MM53200, as illustrated in FIG. 5, twelve channel operation is provided and the frequency is crystal controlled by LM1871.

The frequency used in the embodiment illustrated in FIG. 5 is 49.890 Mhz. This is a license-free frequency, but should a problem arise the frequency can be changed to a dedicated police frequency. Using the twelve switch DIP switch in encoder 34 and in decoder 28 provides for a possible four thousand different switch settings. This provides for a large number of encoding possibilities for each transmitter-receiver combination, and a number of systems in accordance with this invention can be used for signs in close proximity to each other without transmitters from one sign improperly activating a camera associated with another sign.

All capacitors, except capacitor 82 in timer 30, are type NPO which are very stable regardless of temperature variation, and transmitter 24 is preferably powered by a nine volt battery of the type used in small transistor radios.

Although the apparatus herein has been described with specific reference to photographing persons when they shoot traffic signs along highways, it should be understood that the apparatus of this invention can be used for other applications and in other environments. For example, the apparatus can be used with infrared film and infrared light and for various types of surveillance.

The invention in its broader aspects is not limited to the specific details shown and described, and departures may be made from such details without departing from the principles of the invention and without sacrificing its chief advantages.

What is claimed is:

1. Apparatus for photographing persons when they shoot traffic signs along highways, said apparatus comprising:

means in operative relationship with said traffic sign for detecting the impact of a bullet against said sign;

transmitting means in operative relationship with said detecting means for transmitting an encoded radiofrequency signal into the air for a first predetermined time period in response to activation of said detecting means by impact of a bullet against said sign;

receiver means remotely positioned from said transmitting means for receiving said radiofrequency signal from said transmitting means and for providing a first resultant encoded electrical output signal;

means in operative relationship with said receiver means for decoding said encoded output signal and for providing a second resultant electrical output signal; and a camera positioned to enable photographing of said persons and vehicles within a predetermined area adjacent to said traffic sign and in operative relationship with said receiver means and with said decoding means for enabling operation of said camera for said first predetermined time period in response to said second resultant electrical output signal;

said transmitting means including:

timer means in operative relationship with said detecting means for providing a third electrical output signal during said first predetermined time period in response to activation of said detecting means by impact of a bullet against said sign;

encoding menas in operative relationship with said timer means for receiving said third output signal and for providing a fourth resultant encoded electrical output signal; and oscillator-transmitter means in operative relationship with said encoding means for receiving said fourth encoded output signal and for transmitting said resultant encoded radiofrequency signal into the air; and said detecting means including:

a first electrically conducting substantially flat sign number;

a second electrically conducting substantially flat sign member which carries the message of said traffic sign;

a plurality of electrically insulating connectors between said sign members and connecting together said sign members;

an electrically insulating spacer element mounted on each of said connectors and positioned between said first and second sign members for normally maintaining said sign members in predetermined spaced apart relationship with respect to each other;

a first electrically conducting element in contact with said first sign member and in electrical circuit relationship with said transmitting means; and a second electrically conducting element in contact with said second sign member and in electrical circuit relationship with said transmitting means.

2. Apparatus as in claim 12 wherein said first and second conducting elements include first and second washers, respectively, mounted on one of said connectors, said first washer located between said first sign member and said spacer element and said second washer located between said second sign member and said spacer element.

3. Apparatus as in claim 2 wherein said encoding means includes a pulse code encoder.

4. Apparatus as in claim 3 wherein said decoding means includes a pulse code decoder.

5. Apparatus as in claim 4 wherein said camera is in a location remote from said traffic sign.

6. Apparatus as in claim 5 wherein said transmitting means is located on said traffic sign.

7. Apparatus as in claim 5 wherein said transmitting means is positioned at a location away from said traffic sign.

* * * * *